United States Patent [19]

Bauer et al.

[11] 4,264,179

[45] Apr. 28, 1981

[54] ARRANGEMENT FOR OPENING AND CLOSING A FILM SHEET CASSETTE AND A FILM SHEET CASSETTE PROVIDED THEREWITH

[75] Inventors: Walter Bauer, Munich; Heniz Kröbel, Taufkirchen; Heinrich Färber, Munich, all of Fed. Rep. of Germany

[73] Assignee: AGFA-Gevaert, A.G., Leverkusen, Fed. Rep. of Germany

[21] Appl. No.: 106,895

[22] Filed: Dec. 26, 1979

[30] Foreign Application Priority Data

Dec. 29, 1978 [DE] Fed. Rep. of Germany ....... 2856701

[51] Int. Cl.³ .................. G03B 17/26; G03C 5/16
[52] U.S. Cl. ............................ 354/281; 250/481
[58] Field of Search ................... 354/276, 281; 250/475.1, 480, 481

[56] References Cited

U.S. PATENT DOCUMENTS

| 2,878,389 | 3/1959 | Raffman | 250/481 |
| 3,724,352 | 4/1973 | Shimomura | 354/281 |
| 3,836,783 | 9/1974 | Stievenart et al. | 250/481 |

FOREIGN PATENT DOCUMENTS 783786  4/1935  France .................. 250/481

Primary Examiner—Donald A. Griffin
Attorney, Agent, or Firm—Michael J. Striker

[57] ABSTRACT

An arrangement for opening and closing a film sheet cassette having a bottom element and a top element movable relative to the bottom element between open and closed positions, includes a sliding element guided on the bottom element and movable relative to the top element in a first direction from a first position in which it engages the top element and thereby the latter is retained in the closed position to a second position in which said sliding element disengages from the top element and thereby the latter can move to the open position, a spring urging the sliding element into the first engaged position and an arresting device cooperating with the sliding element and operative for preventing unintentional movement of the sliding element from the first engaged position to the second disengaged position by itself or under the action of impacts, and thereby preventing opening of the cassette.

8 Claims, 11 Drawing Figures

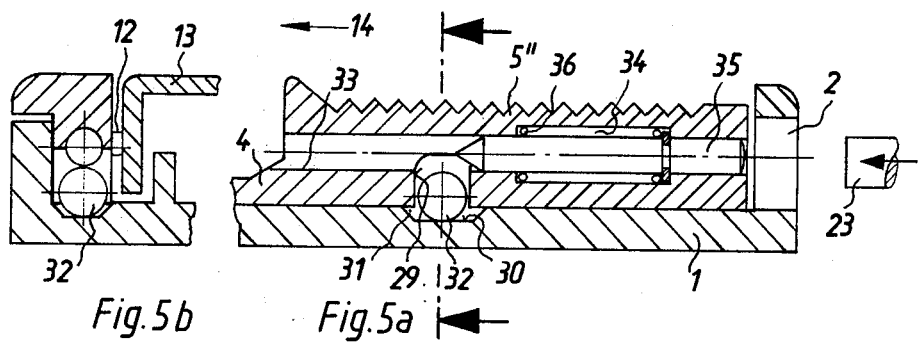
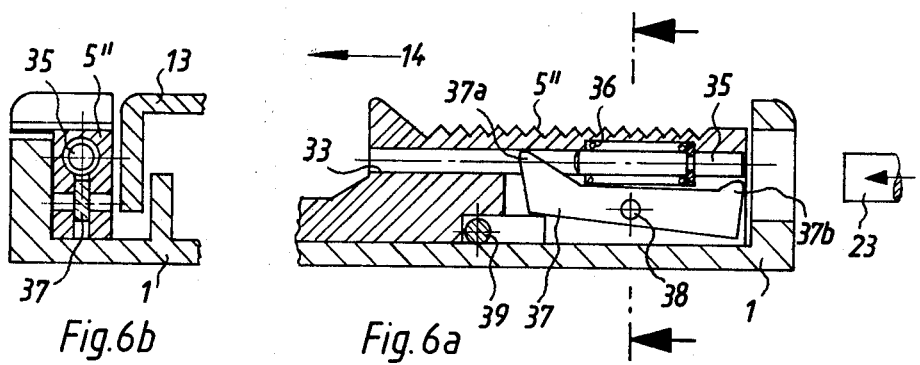

ARRANGEMENT FOR OPENING AND CLOSING A FILM SHEET CASSETTE AND A FILM SHEET CASSETTE PROVIDED THEREWITH

BACKGROUND OF THE INVENTION

The present invention relates to an arrangement for opening and closing of a film sheet cassette, particularly an X-ray film cassette, and to a film sheet cassette provided with this arrangement.

Film sheet cassettes with opening and closing arrangements are widely utilized. A known film sheet cassette has a bottom part, a top part, and a sliding element which is guided on one or two edges of the bottom part, is held in closing position by a spring, and has a hook which in the closing position engages with a pin provided in the top part. Generally, the top part of the film sheet cassette is connected with the bottom part by a hinge at its edge, and closing elements are arranged at a side which is opposite to the side wherein the hinge is provided. Cassettes are also known in which the top part is placed onto the bottom part in parallel direction and connected with the latter by connecting elements provided at at least two opposite sides. In the cassettes of the first mentioned type, several connecting elements are generally provided lengthwise of the connecting side of the cassette. It has been recognized that the known cassettes possess the disadvantage in that there is a danger that such cassettes can be easily opened under the action of impacts delivered in a direction opposite to the opening direction of the sliding element. Also, the probability that during X-ray examination involving manipulation with several cassettes at least one cassette drops on the floor, is relatively high. Opening of the cassette is especially undesirable when it has been exposed inasmuch as the opening of the cassette makes it useless and the patient must be again subjected to X-ray examination involving radiation for the second time.

SUMMARY OF THE INVENTION

Accordingly, it is an object of the present invention to provide an arrangement for opening and closing of film sheet cassettes, and a cassette including such an arrangement, which prevent unintentional opening of the cassette under the action of impacts.

In keeping with these objects and with others which will become apparent hereinafter, one feature of the present invention resides, briefly stated, in an arrangement which has a sliding element guided on a bottom element of the cassette and movable relative to a top element in a first direction from a first position in which it engages the top element and thereby the latter is retained in the closed position to a second position in which said sliding element disengages from the top element and thereby the latter can move to the open position, and spring means urging the sliding element into the first engaged position wherein arresting means is provided for operating the sliding element and operative for preventing unintentional movement of the sliding element from the first engaged position to the second disengages position by itself or under the action of impacts, and thereby preventing opening of the cassette.

Another feature of the present invention is a film sheet cassette which is provided with the above-described opening and closing arrangement.

When the arrangement and the cassette is constructed in accordance with the present invention, the arresting means under the action of impacts performs its arresting function and prevents opening of the cassette. The arresting means is also brought into action by closing of the cassette so as to prevent unintentional opening of the latter.

The novel features which are considered as characteristic for the invention are set forth in particular in the appended claims. The invention itself, however, both as to its construction and its method of operation, together with additional objects and advantages thereof will be best understood from the following description of specific embodiments when read in connection with the accompanying drawings.

BRIEF DESCRIPTION OF THE DRAWING

FIGS. 5a and b are views showing transverse sections of the arrangement in accordance with a fourth embodiment of the present invention; and FIGS. 6a and b are views showing transverse sections of the arrangement in accordance with a fifth embodiment of the present invention.

DESCRIPTION OF PREFERRED EMBODIMENTS

Figure 1:
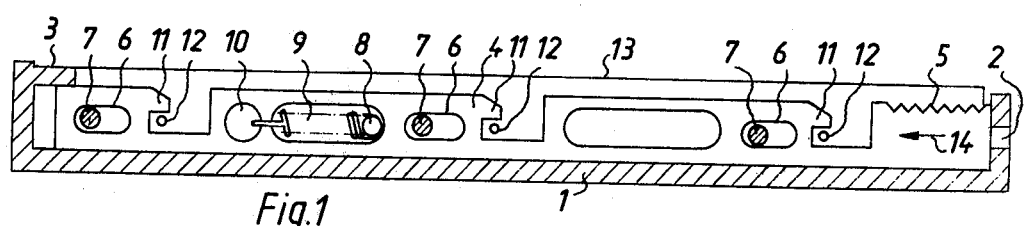
FIG. 1 is a view showing a section of a conventional film sheet cassette.

FIG. 1 shows a cassette which has a bottom element identified by reference numeral 1 and having a side wall provided with an opening 2 through which a pin of an automatic opening mechanism can extend. Reference numeral 3 identifies a part of guiding elements which together with a face of the bottom element forms a guiding passage for a sliding element 4.

The sliding element 4 has a gripping member or portion 5 which is located near the opening 2, and is also provided with elongated slots 6 extending in the direction of movement of the sliding element. Pins 7 arranged on the bottom element 1 extend through the slots 6. A tension spring 9 is suspended on a further pin 8 connected with the bottom element 1. The tension spring 9 has one end inserted into a hole 10 of the sliding element 4 and holds the latter in the shown closed position.

Hooks 11 are further formed on the sliding element 4 and engaged with pins 12 which are mounted on a top element or cover 13 of the cassette. In order to open the cassette, the sliding element 4 is displaced in the direction of arrow 14 with the aid of the gripping member 5 against force of the spring 9 so as to release the hooks 11 from the pins 12 of the cover element 13, whereupon the cover element 13 displaces under the action of its prestress. The displacement of the sliding element 4 in the direction of arrow 14 can also be performed with the aid of a pin which extends through the hole 2 and presses against the sliding element so as to displace the latter in this direction.

The conventional cassette can, however, open also in the cases when it falls on the floor in the direction of arrow 14, or as an impact is delivered against the cassette in a direction opposite to the direction of arrow 14. In accordance with the invention, the displacement of the sliding element 4 under the action of impacts is prevented by an arresting device which may include mechanical elements initially preventing such movement of the sliding element, or inertia elements which are brought into action by impacts and also prevents this movement.

Figures 2A, 2B:
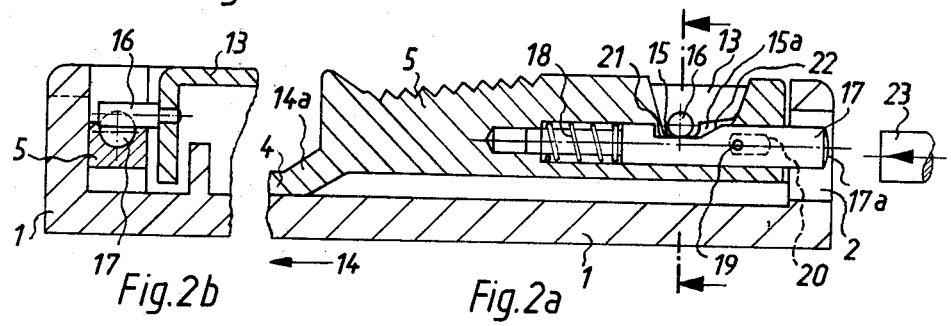
FIGS. 2a and b are views showing two partial sections of an arresting arrangement of a film sheet cassette in accordance with a first embodiment of the present invention.

One construction of such mechanical arresting device is shown in FIGS. 2a and b. The gripping member 5 is spaced from the sliding element 4 in a transverse direction and connected with the latter by an elastic connecting piece 14a, so that the gripping member 5 can be resiliently displaced toward the bottom element 1 of the cassette. The gripping member 5 has a depression 15 in which a pin 16 of the top element 13 is received. A raised portion 15a is also formed in the depression 15 and has a height which somewhat exceeds the half diameter of the pin 16.

In order to automatically open the cassette, a movable pin 17 which extends in the direction of movement of the sliding element 4 is inserted in the gripping element 5. The movable pin 17 has a rounded head 17a located in the opening 2 of the bottom element 1. The movable pin 17 can be displaced in the direction of movement 14 of the sliding element 4 against force of a spring 18. The movable pin 17 is guided on a pin 19 which extends through a slot 20 and is mounted on the gripping member 5.

The movable pin 17 also has a depression 21 provided with an outwardly extending inclined surface 22. The depression 21 is so dimensioned that the pin 16 in closed condition is located in this depression, the inclined surface 22 upon displacement of the movable pin slides over the pin 16, and thereby the gripping member 5 is displaced downwardly. As a result of this, the raised portion 15a is released, and the sliding element 4 can be displaced to the open position. The operation of the arrangement shown in FIGS. 2a and b is as follows: The pin 16 retains the gripping member 5 and thereby the sliding element 4 in the condition of striking action against movement of the sliding element to the open position. When a user presses against the gripping element 5, the latter displaces against force of the elastic connecting piece 14a. Thereby, the raised portion 15a moves downwardly beyond the pin 16 and the sliding element 4 moves in the direction of arrow 14. In the event of automatic opening, a member 23 of an automatic opening mechanism presses against the rounded head 17a of the movable pin 17, whereby the latter displaces against the force of the spring 18 in the direction 14. When the inclined surfaces 22 moves over the pin 16, the entire gripping element is placed against the bottom element 1 of the cassette. The raised portion 15a moves downwardly so as to release the pin 16, and the member 23 displaces the movable pin 17 with the gripping member 5 and the sliding element to the open position in the direction 14.

Figures 3A, 3B:
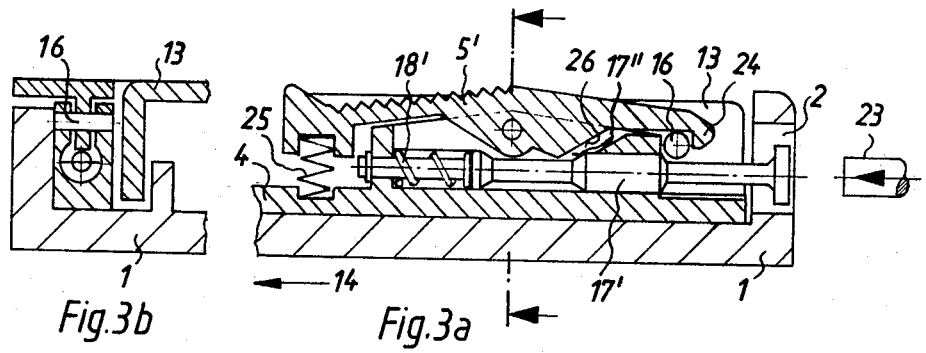
FIGS. 3a and b are views showing transverse sections of the arrangement in accordance with a second embodiment of the invention.

FIGS. 3a and b show a second construction of the arresting arrangement in accordance with the present invention. In these Figures parts which are identical to the parts of FIGS. 2a and b are identified by identical reference numerals. The gripping member is formed here by a rotatable rocking member 5' which can turn about an axis extending transverse to the direction of movement of the sliding element 4. The rocking member 5' has a hook 24 at its one end, the hook engaging with the pin 16 of the top element 13 of the cassette. A spring 25 acts between the sliding element 4 and the rocking member 5' and retains the latter in the closed position.

The gripping portion of the rocking member 5' is pressed, the latter rotates in the counterclockwise direction and overcomes force of the spring 25, whereby the hook 24 is released from the pin 16. Thus, the sliding element 4 can be displaced in the direction 14. In order to automatically open the cassette, a movable pin 17' is provided which can be displaced in the sliding element 4 against the force of a spring 18' in the direction 13. The rocking member 5' has an inclined surface 26 which cooperates with an inclined surface 17" provided on the movable pin 17'. When the movable pin 17' is displaced in the direction 14 with the aid of the member 23, the inclined surface 17" presses against the inclined surface 26 of the rocking member 5' upwardly. Thereby the locking member 5' turns in the counterclockwise direction and the pin 16 is released in the above-mentioned manner.

Figures 4A, 4B:
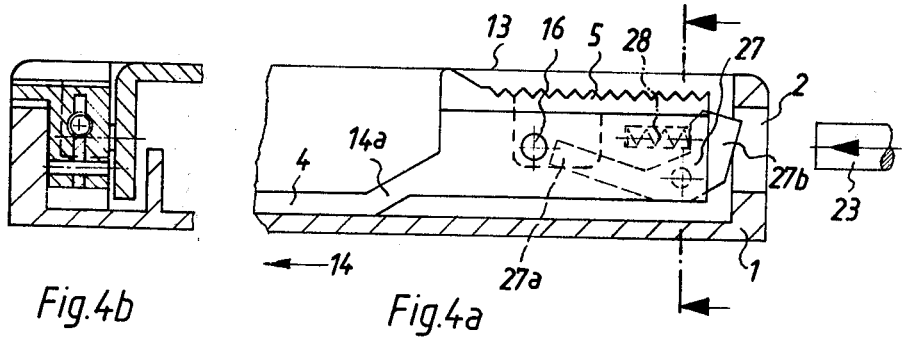
FIGS. 4a and b are views showing transverse sections of the arrangement in accordance with a third embodiment of the invention.

FIGS. 4a and b show a third construction of the arresting arrangement. Similarly to the first construction, the gripping member 5 is connected with the sliding element 4 by the elastic connecting piece 14a. A lever 27 is pivotably mounted on the gripping member 5 and retained in the shown rest position by a pressure spring 28 arranged in the gripping member 5. In this rest position, an end portion 27a of the lever extends toward one side of the pin 16 of the top element 13, whereby movement of the sliding element 4 in the direction 14 is prevented.

When the gripping member 5 is pressed toward the bottom element of the cassette in the abovementioned manner, the end portion 27a of the lever 27 is displaced out of the path of movement of the pin 16, so that the sliding element 4 can be displaced in the direction 14. In the event of automatic opening, the member 23 presses against the other end portion 27b located in the opening 2, whereby the lever is turned against force of the pressure spring 28 and the end portion 27a is again turned away from its arresting position. During further displacement of the member 23 the gripping member 5 with the sliding element 4 can be displaced in the direction 14.

FIGS. 5a and b show an arresting arrangement which operates under the action of inertia forces. It includes a gripping member 5" which is connected with the sliding element 4 and has a depression 29 at a side located opposite to the bottom element. The bottom element 1 has a depression 30 with upwardly inclined surfaces 31. A ball 32 is inserted in the above described depressions. When the gripping member 5" displaces in the direction 14, the ball 32 can be displaced with the gripping member and slide over the inclined surface 31 upwardly out of the depression 29.

A passage 33 is further provided in the gripping member 5". This passage extends in the direction 14 and has a transverse extension 34. A movable pin 35 is accommodated in the passage 33 and held in the shown rest position by a spring 36 having very small pressure force. The passage 33 crosses the depression 27, so that its periphery almost contacts with the ball 32 accommodated in the depression 30. The spring 36 is located in the extension 30 of the gripping member 5". For opening of the cassette the gripping member 5" is displaced in the direction 14. As mentioned above, the ball 32 is taken away from the depression 29 and brought over the inclined surface 31 upwardly onto the bottom element 1 of the cassette. This displacement of the gripping element 5" can be performed by the opening member 23 which have an engaging surface exceeding the cross section of the movable pin 35.

When, however, an impact is delivered in the direction opposite to the direction 14, the movable pin 35 moves under the action of its inertia in the direction 14 and closes the space above the ball 32. Thereby the ball 32 during movement of the gripping member 5" abuts against the inclined surface 31 and prevents further displacement of the gripping member. Since the sliding element 4 connected with the gripping member 5" must overcome different friction torques, the abovementioned displacement of the movable pin 35 takes place somewhat faster, whereby the movable pin 35 overlaps the path of movement of the ball 32 before the beginning of displacement of the sliding element 4 with the gripping member 5".

FIGS. 6a and b also show an arresting arrangement which operates under the action of inertia forces. This arrangement also includes the pin 35 which is arranged in the gripping member 5" and movable in the direction 14 against force of the weak spring 36. A rocking member 37 is provided between the gripping member 5" and the bottom element 1 of the cassette. The gripping member 5" is pivotal about an axis 35 extending in a direction transverse to the direction 14. An end portion 37a of the rocking member 37 extends in the passage 33 for the movable pin 35 and is located somewhat in front of the inwardly facing end portion of the pin. The other end portion 37b of the rocking member 37 almost contacts the outer end of the movable pin 35.

The rocking member 37 has an inclined surface at the side opposite to the bottom element 1. In the above-described rest position of the rocking member, this inclined surface during displacement of the gripping member 5" can slide over a projection 39 which is fixedly connected with the bottom element. When, however, impact action takes place in the direction opposite to the direction 14, the movable pin 35 displaces in the direction 14 and its inner end portion turns the end portion 37a of the rocking member 37 so that this end portion is withdrawn from the passage 32 and thereby the rocking member 37 turns in the counter-clockwise direction. Thereby the rocking member 37 is rotated until it abuts against the bottom element 1. In the latter position, displacement of the gripping member 5" results in that the front edge of the end portion 37a of the rocking member abuts against the projection 39 and further movement of the gripping member is prevented.

After the impact, the movable pin is returned to its initial position by the spring 26. Thereby the outer end portion of the movable pin presses against the other end portion 37b of the rocking member 37 and displaces the same out of the passage 33. The rocking member 37 is turned in clockwise direction so as to assume its first position. In the latter position the gripping member 5" can be displaced by the user either by hand or via the member 23.

It will be understood that each of the elements described above, or two or more together, may also find a useful application in other types of constructions differing from the types described above.

While the invention has been illustrated and described as embodied in an arrangement for opening and closing a film sheet cassette and a film sheet cassette provided therewith, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. An arrangement for opening and closing a film sheet cassette having a bottom element and a top element having a projection and movable relative to the bottom element between an open and closed positions, the arrangement comprising a sliding element guided on the bottom element and movable relative to the top element in a first direction from a first position in which it engages the top element and thereby the latter is retained in the closed position, to a second position in which said sliding element disengages from the top element and thereby the latter can move to the open position; spring means urging sliding element into said first position; arresting means cooperating with said sliding element; and a gripping member connected to said sliding element, said arresting means being arranged in said gripping member, said sliding element and said gripping member each forming a cooperating member, said arresting means including a shaped portion which is formed on one of said cooperating members and cooperates with said projection of the top element, said gripping member having a recess in which the projection of the top element is received and being connected with said sliding element by an elastic piece which allows displacement of said gripping member in a direction transverse to said first direction, so that in received position of the projection said shaped portion abuts against the latter and the unintentional movement of said sliding element is prevented, whereas in displaced position of said gripping member said shaped portion does not abut against the projection and said sliding element can be moved from said first engaged position to said second disengaged position for intentional opening of the cassette.

2. An arrangement as defined in claim 1; and further comprising a pin member which is guided in said gripping member by a user said pin member having an inclined surface cooperating with the projection on the top element so that by displacement of said pin member, said gripping member is moved to said displaced position.

3. An arrangement for opening and closing a film sheet cassette having a bottom element and a top element having a projection and movable relative to the bottom element between open and closed positions, the arrangement comprising a sliding element guided on the bottom element and movable relative to the top element in a first direction from a first position in which it engages the top element and thereby the latter is retained in the closed position, to a second position in which said sliding element disengages from the top element and thereby the latter can move to the open position; spring means urging sliding element into said first position; arresting means cooperating with said sliding element; a gripping member connected to said sliding element, said arresting means being arranged in said gripping member, said sliding element and said gripping member each forming a cooperating member, said arresting means including a shaped portion which is formed on one of said cooperating members and cooperates with said projection of the top element, said gripping member being formed as a rocking member having a node forming said shaped portion, said rocking member being urged by a spring to an arresting position in which said shaped portion cooperates with the projection of the top element so as to prevent the unintentional movement of said sliding element from said first engaged position to said second disengaged position; and a pin member extending through said sliding element and below said gripping member and displaceable by a user, said pin member having an inclined surface which by displacement of said pin member acts upon said gripping member so as to cease the cooperation of said shaped portion with the projection of the top element, whereby said sliding member can be moved from said first position to said second position for intentional opening of the cassette.

4. An arrangement for opening and closing a film sheet cassette having a bottom element and a top element having a projection and movable relative to the bottom element between open and closed positions, the arrangement comprising a sliding element guided on the bottom element and movable relative to the top element in a first direction from a first position in which it engages the top element and thereby the latter is retained in the closed position, to a second position in which said sliding element disengages from the top element and thereby the latter can move to the open position; spring means urging sliding element into said first position; arresting means cooperating with said sliding element; and a gripping member connected to said sliding element, said arresting means being arranged in said gripping member, said sliding element and said gripping member each forming a cooperating member, said arresting means including a shaped portion which is formed on one of said cooperating members and cooperates with said projection of the top element and an arresting element pivotally mounted on said gripping member and provided with said shaped portion and a spring urging said arresting element so that said shaped portion abuts against said projection of the top element so as to prevent the unintentional movement of said sliding element from said first position to said second position, said arresting element upon displacement of said gripping member by a user being also displaced so that the abutment of said shaped portion against the projection of the top element ceases and said sliding element can move from said first position to said second position for intentional opening of the cassette.

5. An arrangement as defined in claim 4, wherein said arresting element has a portion arranged to be urged by a member laterally insertable into the interior of the cassette so that said arresting element pivots and thereby the abutment of said shaped portion against the projection of the top element ceases.

6. An arrangement for opening and closing a film sheet cassette having a bottom element and a top element movable relative to the bottom element between open and closed positions, the arrangement comprising a sliding element guided on the bottom element and movable relative to the top element in a first direction from a first position in which it engages the top element and thereby the latter is retained in the closed position, to a second position in which said sliding element disengages from the top element and thereby the latter can move to the open position; spring means urging sliding element into said first engaged position; and arresting means cooperating with said sliding element; a gripping member connected to said sliding element, said arresting means being arranged in said gripping member, said sliding element and said gripping member each forming a cooperating member, said arresting means including an arresting device preventing movement of said sliding element from said first position to said second position, a low force spring, and a pin member movable in said first direction by a user against force of said spring so as to release said arresting device and to thereby cease its preventing action.

7. An arrangement as defined in claim 6, wherein said arresting device includes an arresting member displaceable between a rest position in which it block the movement of one of said cooperating members and a displaced position in which it does not block said movement, said pin member being arranged to prevent the displacement of said arresting member and to allow said displacement only when said pin member is moved in said first direction by a user.

8. An arrangement as defined in claim 6, wherein the bottom element has an abutment, said arresting device including an arresting element which is engageable with the abutment so as to prevent movement of one of said cooperating members and activated by said pin member by a user so as to be disengaged from said abutment and to thereby allow the movement of said one cooperating member.

* * * * *